United States Patent
Baugh et al.

(10) Patent No.: US 6,792,665 B2
(45) Date of Patent: Sep. 21, 2004

(54) METHOD OF SECURING A CONNECTION AGAINST BREAKOUT TORQUE

(75) Inventors: John L. Baugh, Houston, TX (US); Michael Carmody, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 147 days.

(21) Appl. No.: 10/177,984

(22) Filed: Jun. 21, 2002

(65) Prior Publication Data

US 2003/0106618 A1 Jun. 12, 2003

Related U.S. Application Data

(63) Continuation-in-part of application No. 10/010,866, filed on Dec. 6, 2001, now Pat. No. 6,619,696.

(51) Int. Cl.[7] ............................. B21D 39/00; B23P 11/00
(52) U.S. Cl. ........................ 29/507; 29/506; 29/428
(58) Field of Search ..................... 29/428, 506, 507; 148/220, 222; 285/92, 333

(56) References Cited

U.S. PATENT DOCUMENTS

3,727,948 A * 4/1973 Current ........................ 285/3
6,322,109 B1   11/2001 Campbell et al.

FOREIGN PATENT DOCUMENTS

| JP | 406109173 | * | 4/1994 |
| WO | WO 01/04520 A1 | | 1/2001 |

* cited by examiner

Primary Examiner—John C. Hong
(74) Attorney, Agent, or Firm—Steve Rosenblatt

(57) ABSTRACT

A thread for expandable downhole tubular connections is disclosed. The thread on at least one of the pin and box is coated, preferably with an anti-galling compound. During expansion the coating crumbles and the particles in between the threads keep the joint from becoming undone despite longitudinal shrinkage from the expansion or any tendency of the swage to impart a rotational motion on one part of the joint during the expansion process.

13 Claims, 5 Drawing Sheets

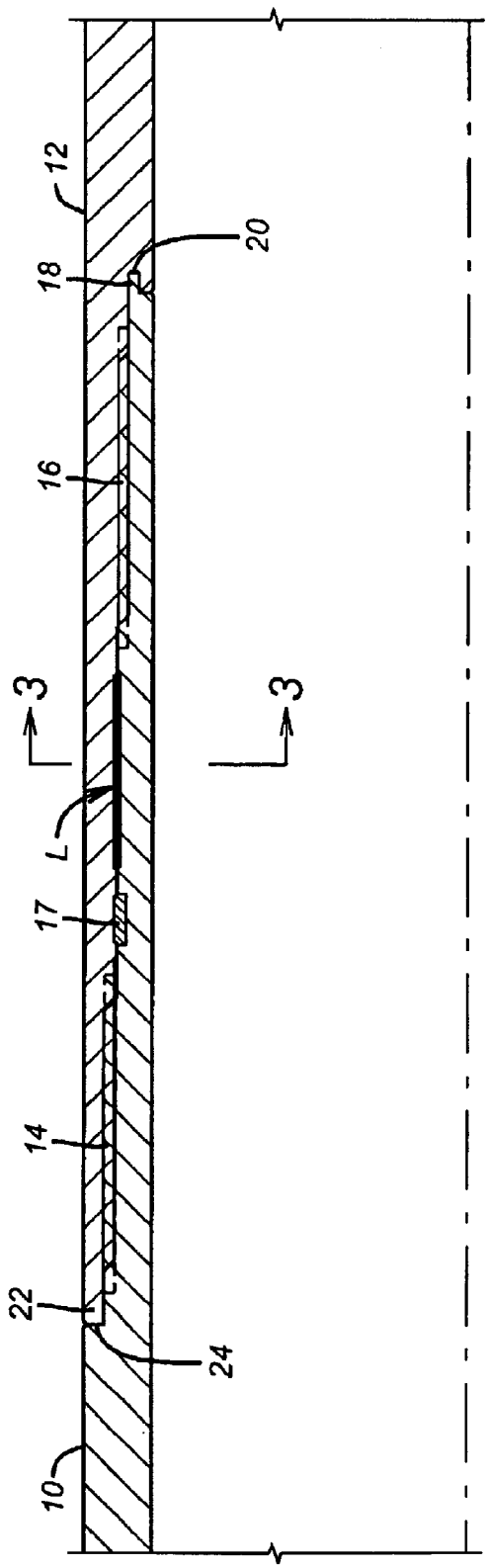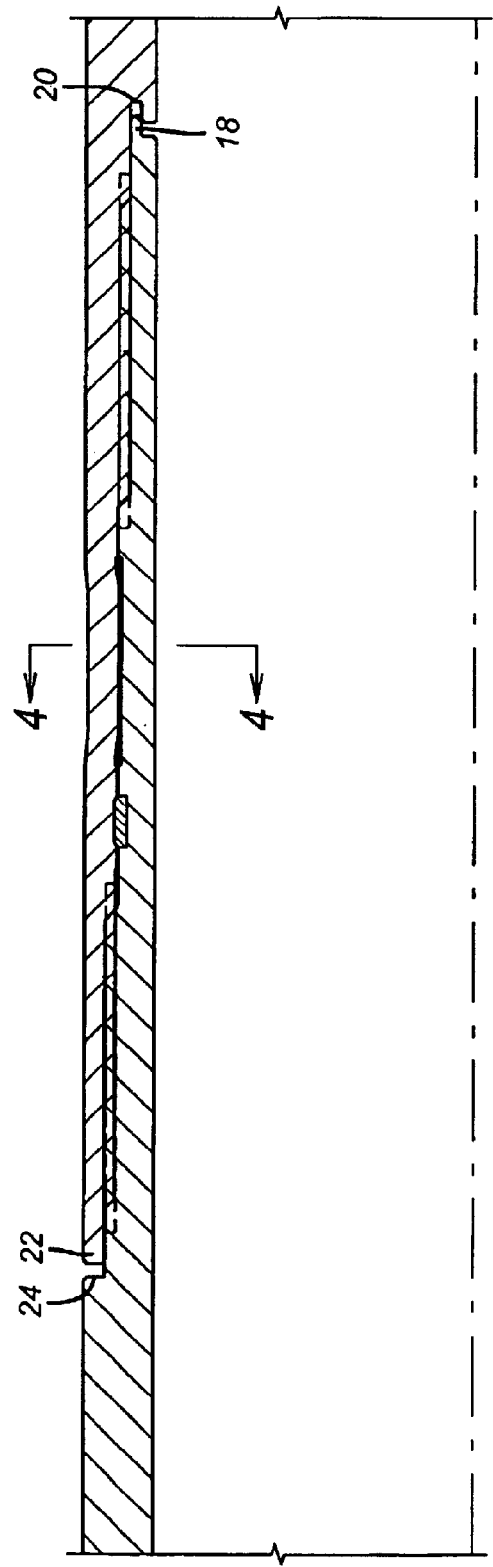

METHOD OF SECURING A CONNECTION AGAINST BREAKOUT TORQUE

RELATED APPLICATION

This application is a continuation in part of application Ser. No. 10/010,866 filed Dec. 6, 2001 now U.S. Pat No. 6,619,696.

FIELD OF THE INVENTION

The field of the invention is tubular connections, which are expanded downhole, and more particularly threads that retain makeup torque despite longitudinal shrinkage resulting from expansion downhole.

BACKGROUND OF THE INVENTION

Oilfield tubular joints comprise a threaded pin and box which are made up against one or more torque shoulders with a force than can exceed 3000 foot pounds. Some designs further incorporate a resilient seal. One of the problems with such seals is that they fail because of a residual clearance in the seal area between the pin and the box, after makeup. When such joints are used downhole and expanded, longitudinal shrinkage at the pin end results in a pulling away of the pin end from the torque shoulder on the box. This allows very low torque levels to undo the connection with values as low as 200 foot-pounds or less. This longitudinal shrinkage can also eliminate the metal-to-metal seal, which existed after makeup and before expansion. Additionally, an advancing swage can impart a rotational movement, which can undo the threaded connection in the presence of the longitudinal shrinkage previously described.

The present invention seeks to overcome, or at least alleviate, these shortcomings of the prior designs. It provides for a locking feature that retains the makeup torque and that is energized due to the expansion. It reduces or eliminates clearance around resilient seals due to the expansion. It also seeks to enhance the locking feature using spaced seals, which can trap atmospheric pressure between them, such that upon insertion downhole, hydrostatic pressure can push the box into the pin to better engage a locking feature. In a preferred embodiment at least one of the pin or box threads are treated with a material designed to reduce galling. The effect of this coating is to harden the surface to which it is applied. Upon expansion after makeup, this hardened surface crumbles, with the particles locking the thread against backing off. These and other advantages of the present invention can be more readily appreciated by a review of the detailed description of the preferred embodiment, which appears below.

SUMMARY OF THE INVENTION

A thread for expandable downhole tubular connections is disclosed. The thread on at least one of the pin and box is coated, preferably with an anti-galling compound. During expansion the coating crumbles and the particles in between the threads keep the joint from becoming undone despite longitudinal shrinkage from the expansion or any tendency of the swage to impart a rotational motion on one part of the joint during the expansion process.

BRIEF DESCRIPTION OF THE DRAWINGS

FIG. 1 is an elevation in section of the connection after makeup and before expansion;

FIG. 2 is the view of FIG. 1 after expansion;

DETAILED DESCRIPTION OF THE PREFERRED EMBODIMENT

Figure 9:
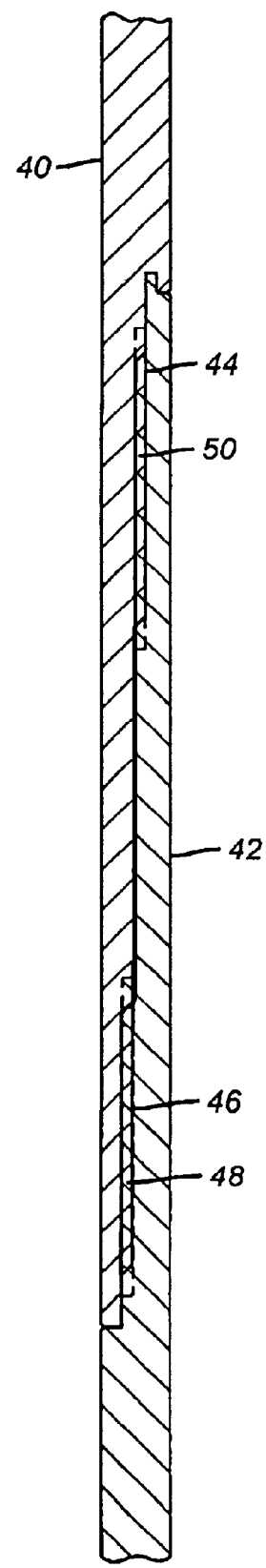
FIG. 9 is a view of a typical threaded joint with the coating applied to lock it in place.

FIG. 9 illustrates the preferred embodiment. A pin 42 is secured to a box 40 at threads 44 and 46. The nature of the thread and the number of thread sections are matters of known design. The invention comprises a coating 48 or 50 that is preferably applied to either the pin or box portions of threads 44 or 46. The threads 44 or/and 46 can be treated in this manner. Optionally, both the pin and box components of the individual threads 44 or/and 46 can be treated. Other types of joints can be treated in the same manner, although a threaded joint is preferred. The preferred coating is a liquid salt bath or plasma nitriding process to get a desired coating thickness in the range of about 0.002 to about 0.006 inches and the coating is preferably of uniform depth within this range. This coating also results in surface hardening to about 60 Rockwell C for a depth of approximately 0.001 inch or less. This hardened surface cracks during expansion into many small particles. These particles bridge within the thread 44 and/or 46 and prevent back off due to shrinkage or rotational movement imparted by a swage during expansion. For example, a connection treated with the method of the present invention and torqued to 2000 foot pounds and expanded 20% required consistently over 12,000 foot pounds to undo, as compared to an untreated threaded joint, where the torque required for breakout was as low as 3,000 foot pounds. Increasing the breakout torque by a factor of 4 or more is a benefit of the present invention. This can be important with casing as subsequent drilling activities can put substantial torque on the made up connections in a direction that can undo them. Using the method of the present invention insures that the joints remain tight. A loose joint is a potential safety hazard. The joints in question can be on solid pipe, perforated pipe or screen. As another advantage, the presence of the coating also facilitates original makeup by making the threads easier to join together. The nitride coating can be applied by known techniques of liquid salt bath or plasma. It adds the advantage of reducing galling to make subsequent undoing of the threaded joint possible while at the same time as it gives the advantage of high resistance to being undone after the made up joint is expanded.

Referring to FIG. 1, the connection comprises a pin 10 threaded into a box 12. A two-step thread is illustrated comprising thread pairs 14 and 16, which are spaced apart to allow the placement of a resilient seal 17 and the locking feature L in between. Upon makeup, the pin end 18 is against a torque shoulder 20 on the box 12. The box end 22 is against a torque shoulder 24 on the on the pin end 18. While a two-step thread is illustrated, a single or multi-step thread or other ways to connect the pin 10 to the box 12 are within the scope of the invention. For example, the connection could be a bayonet type involving pushing the pin 10 into the box 12 and relatively rotating them into a made up position, prior to expansion downhole. A wide variety of thread forms can also be used in the connection of the present invention. The locking feature L can be used alone, without the resilient seal 17. One or more resilient seals 17 can be used, with or without the locking feature L. These combinations and their benefits will be described in more detail below.

As seen in FIG. 1, when the joint is made up the pin and box ends are against their respective torque shoulders to hold the applied torque to the joint on makeup. However, upon expansion, as shown in FIG. 2, the pin end 18 has reduced in length and pulled away from its corresponding torque shoulder 20. Similarly, the box end 22 has pulled away from its corresponding torque shoulder 24. To prevent very low applied toques from undoing the joint after downhole expansion, the locking feature L, engages as a result of the expansion. It should be noted that the downhole expansion could be accomplished in a variety of ways, as contemplated in the present invention. A swage, applied pressure, or an inflatable are but three of the various ways contemplated to carry out the downhole expansion.

Figure 3:
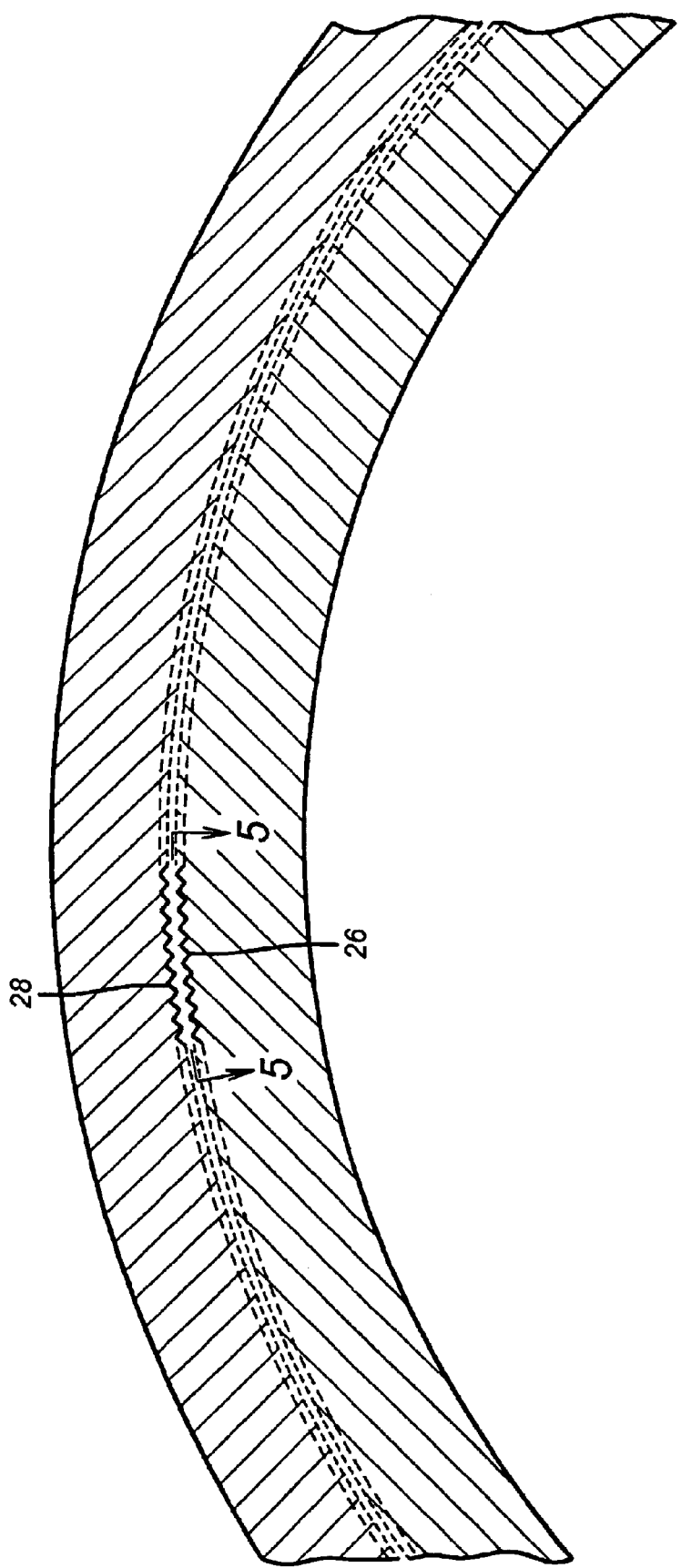
FIG. 3 is a section along line 3—3 of FIG. 1.
Figure 4:
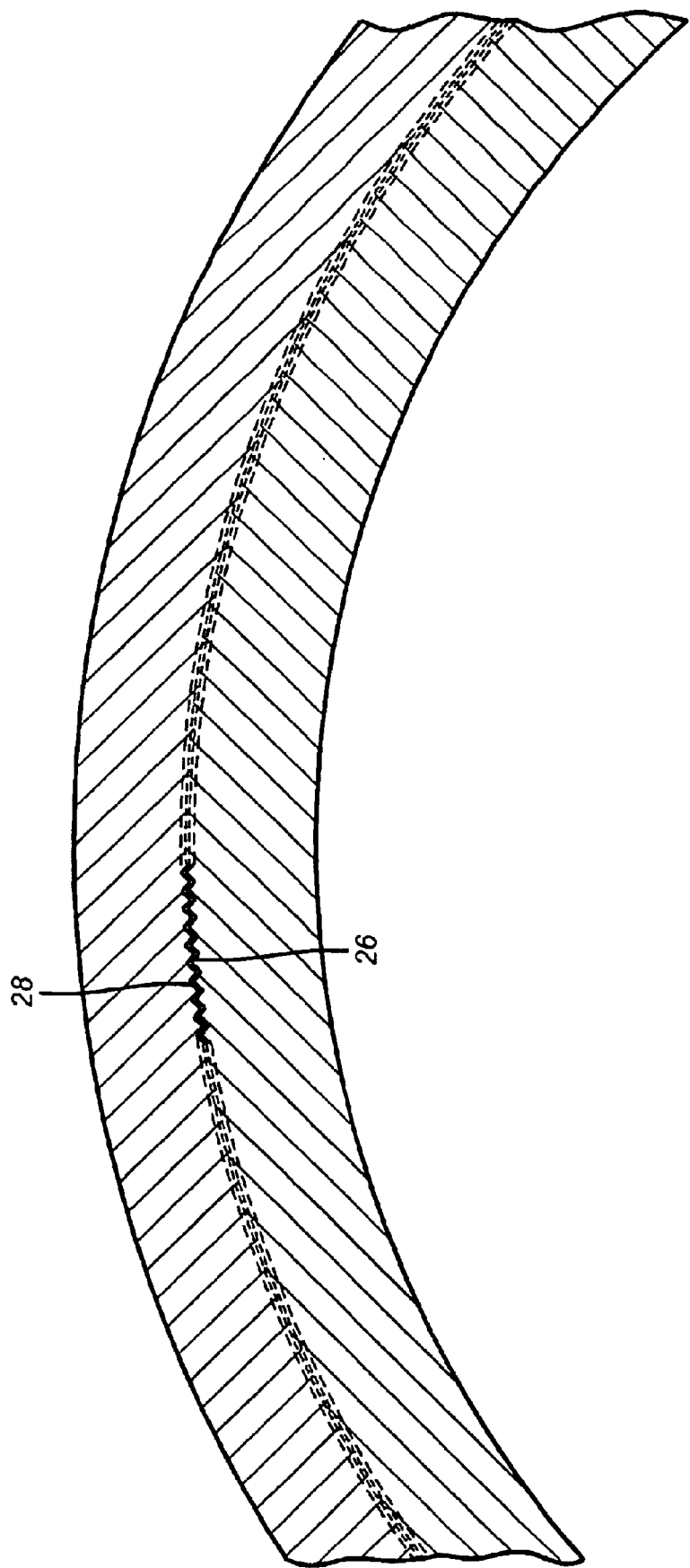
FIG. 4 is a section along line 4—4 of FIG. 2.
Figure 5:
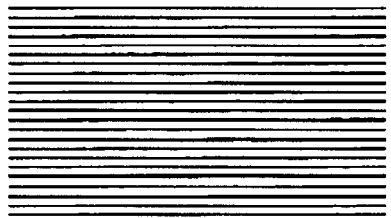
FIG. 5 is the view along line 5—5 of FIG. 3.
Figure 6:
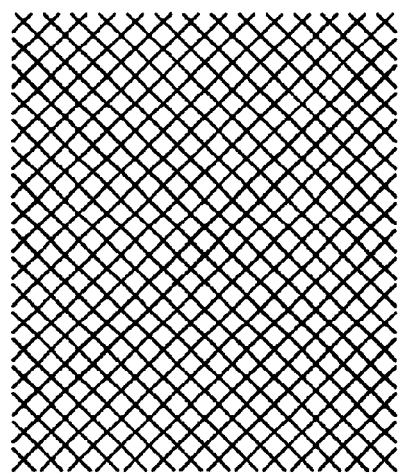
FIG. 6 is an alternative design to the locking profile shown in FIG. 5.

As a result of the expansion downhole, surfaces 26 and 28, which had been apart after makeup and before expansion as shown in FIG. 3, move into intimate contact, as shown in FIG. 4. Surface 26 is disposed on the pin 10 and surface 28 is on the box 12. These surfaces face each other and can be continuous or discontinuous. FIG. 5 shows a pattern of parallel ridges as one of the surface treatments for these surfaces and FIG. 6 shows an alternative diamond pattern. The parallel ridges are preferably oriented in alignment with the longitudinal axis of the joint. The invention contemplates a wide variation of surface treatments for surfaces 26 and 28, with the desired objective being that the joint is locked together after expansion as these surfaces engage. These surfaces do not need to have identical patterns that engage. Additionally only one surface can have a surface treatment and can engage the opposing cylindrical surface, which has no surface treatment. The surface treatment can be created in a variety of ways by either removing material from the surface or adding material to it. The surface treatment can be in an ordered pattern or a random array of projections and associated depressions. The overlap between the surface treatment on surfaces 26 and 28 can be total or partial. The projections can have a variety of configurations and dimensions. The limiting factor is that projections from surfaces 26 and 28 should not contact each other when the joint is made up. The locking aspect arises from inter-engagement, which occurs after the expansion downhole.

Figure 7:
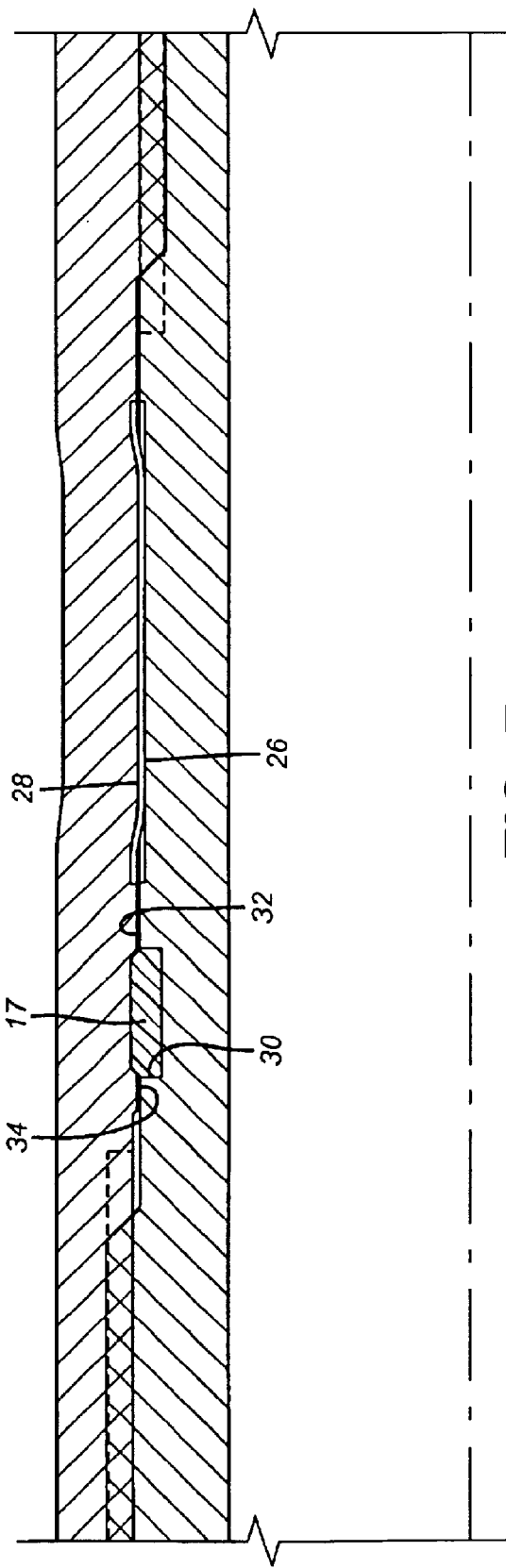
FIG. 7 is a more detailed view of FIG. 2.

FIG. 7 illustrates in more detail the engaged surfaces 26 and 28 of the locking feature L. It also illustrates the combination of the locking feature L with a single resilient seal 17. Seal 17 is disposed in a groove 30 in surface 32. Seal 17 extends beyond surface 32 into contact with surface 34 as the joint is torqued up at the surface. After makeup, surfaces 32 and 34 are spaced apart, as would be necessary to allow the joint to be made up. However, after expansion surfaces 32 and 34 are in contact with preferably zero clearance. The contact may be tight enough to form a metal-to-metal seal between these surfaces, above or/and below seal 17. In any event, the clearance is preferably eliminated taking away a common failure mode of resilient seals such as 17. The seal 17 may be in the middle of the thread, as shown if FIG. 7, or in any position with respect to the thread, as contemplated by the invention. Similarly, the locking feature L can be in any position with respect to the thread and not only between steps of a two-step thread, as shown in FIG. 7. The locking feature can be above or below the thread and the thread can be in a variety of configurations including but not limited to multi-step threads.

Figure 8:
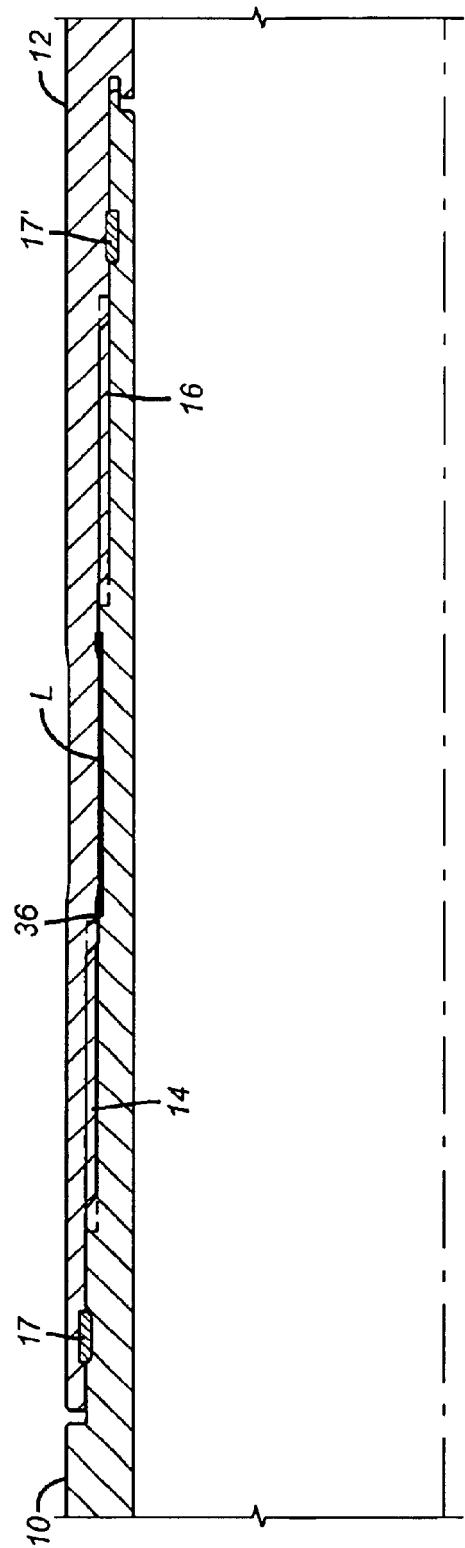
FIG. 8 is an alternative embodiment showing a pair of resilient seals.

FIG. 8 illustrates the use of at least two resilient or other type of seals 17 and 17'. In this embodiment, seals 17 and 17' are above and below the thread pairs 14 and 16 creating a trapped annular volume 36 between the pin 10 and the box 12 when the joint is made up at the surface. The locking feature L is shown disposed between the thread pairs 14 and 16. When the joint goes downhole, hydrostatic pressures act on the outside of the box 12 pushing it toward the pin 10 because the pressure in the annular volume 36 is still only atmospheric. The result is a reduction of volume of annular volume 36 to the point where the residual pressure can be sufficient to engage the surfaces 26 and 28 of the locking feature L even before downhole expansion. It should be noted that the use of multiple seals to create a trapped volume at atmospheric pressure between the pin and the box, could be employed with or without the locking feature L, as contemplated by the invention. Additionally, any type of connection configuration can be used with the trapped low pressure annular volume feature, all within the scope of the invention.

The above description is illustrative of the preferred embodiment and many modifications may be made by those skilled in the art without departing from the invention whose scope is to be determined from the literal and equivalent scope of the claims below:

We claim:
1. A method of securing a connection against breakout torque after expansion, comprising:
  hardening the surface of at least one of a male and female component of a joint;
  connecting said male and female portion of the joint to form an assembled joint;
  running said assembled joint downhole;
  expanding said assembled joint.
2. The method of claim 1, further comprising:
  hardening to about 60 Rockwell C and above.
3. The method of claim 1, further comprising:
  hardening to depth of about 0.001 inch or less.
4. The method of claim 1, further comprising:
  hardening using a nitriding process.
5. The method of claim 4, further comprising:
  using a liquid salt bath as the nitriding process.
6. The method of claim 4, further comprising:
  using plasma as the nitriding process.
7. The method of claim 1, further comprising:
  hardening a thread on at least one of a male and female component of the joint.
8. The method of claim 7, further comprising:
  hardening a thread on both a male and female component of the joint.
9. A method of securing a connection against breakout torque after expansion, comprising:
  hardening the surface of at least one of a male and female component of a joint;
  connecting said male and female portion of the joint to form an assembled joint;
  running said assembled joint downhole;
  expanding said assembled joint;
  breaking said hardened surface by said expanding.
10. A method of securing a connection against breakout torque after expansion, comprising:
  hardening the surface of at least one of a male and female component of a joint;
  connecting said male and female portion of the joint to form an assembled joint;

running said assembled joint downhole;

expanding said assembled joint;

hardening using a nitriding process;

breaking said hardened surface into broken pieces due to said expanding.

11. The method of claim 10, further comprising:

using said broken pieces of said hardened surface to interact to raise said breakout torque required to undo the joint.

12. The method of claim 10, further comprising:

increasing said breakout torque for the joint by a factor of about 4 times by said hardening.

13. A method of securing connection against breakout torque after expansion, comprising:

hardening the surface of at least one of a male and female component of a joint;

connecting said male and female portion of the joint to form an assembled joint;

running said assembled joint downhole;

expanding said assembled joint;

increasing said breakout torque for the joint by a factor of about 4 times by said hardening.

\* \* \* \* \*